United States Patent [19]
Jönsson

[11] Patent Number: 5,351,610
[45] Date of Patent: Oct. 4, 1994

[54] PEELING MACHINE FOR VEGETABLE PRODUCTS

[75] Inventor: Bo Jönsson, Manne Måns väg, Sweden

[73] Assignee: Limas AB, Ahus, Sweden

[21] Appl. No.: 79,011

[22] Filed: Jun. 18, 1993

[30] Foreign Application Priority Data

Jul. 24, 1992 [SE] Sweden .................. 9202245

[51] Int. Cl.⁵ .......................... A23N 7/00; A23N 7/02
[52] U.S. Cl. ........................ 99/628; 99/623; 99/626; 99/630
[58] Field of Search .............. 99/519, 623–626, 99/629, 630; 15/3.19, 3.2; 426/481–483; 134/132

[56] References Cited

U.S. PATENT DOCUMENTS

| | | | |
|---|---|---|---|
| 1,995,693 | 3/1935 | Urschel | 99/629 X |
| 3,566,942 | 3/1971 | Smith | 99/625 |
| 3,745,914 | 7/1973 | Wallace | 99/630 |
| 3,854,395 | 12/1974 | Hirahara | 99/624 |
| 3,946,658 | 3/1976 | Smith | 99/627 |
| 4,132,162 | 1/1979 | Magnuson | 99/630 |
| 4,237,782 | 12/1980 | Bichel | 99/625 |
| 4,519,305 | 5/1985 | Vanosdall | 99/626 X |
| 4,827,836 | 5/1989 | Neidigh | 99/626 |
| 5,106,641 | 4/1992 | Bichel | 426/483 |

FOREIGN PATENT DOCUMENTS

| | | |
|---|---|---|
| 0224108 | 6/1987 | European Pat. Off. . |
| 7236510 | 10/1972 | France . |
| 431283 | 1/1984 | Sweden . |
| 2095538 | 10/1982 | United Kingdom . |

*Primary Examiner*—Timothy F. Simone
*Attorney, Agent, or Firm*—Baker & Daniels

[57] ABSTRACT

A peeling machine for batchwise peeling of vegetable products comprises a container (6) for receiving the vegetable products and peeling means (14) in the container for removing the peel of the vegetable products during relative movement and engagement between the vegetable products and the peeling means. The bottom of the container is at least partially constituted by a number of rotatable peeling rollers (14) positioned in parallel with each other.

16 Claims, 4 Drawing Sheets

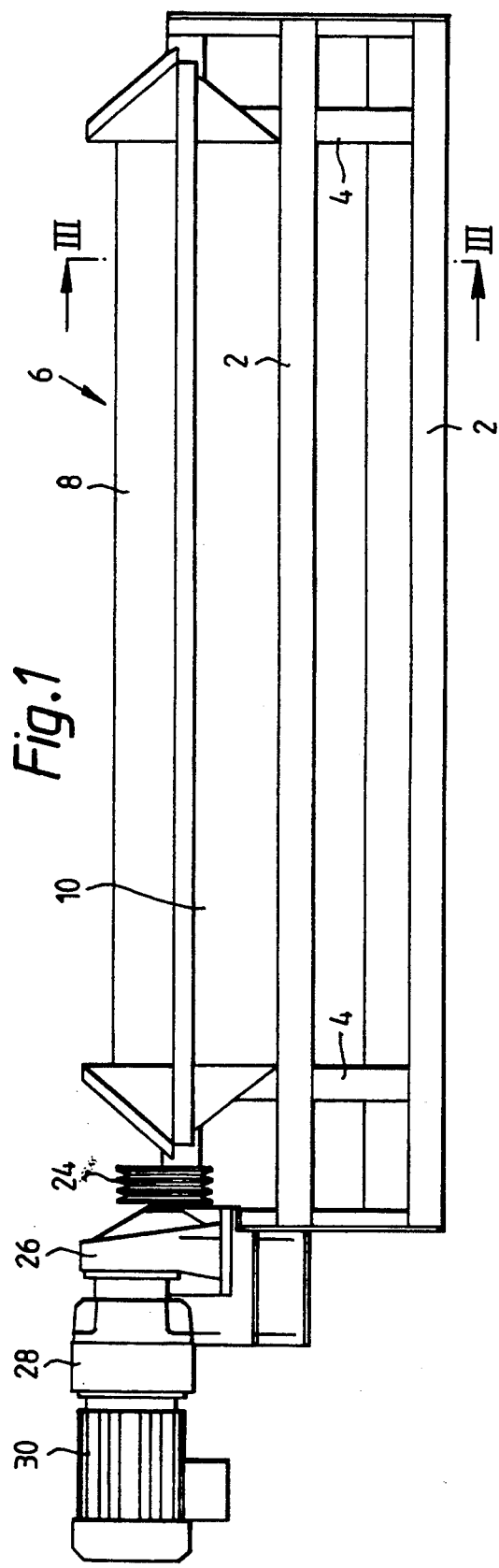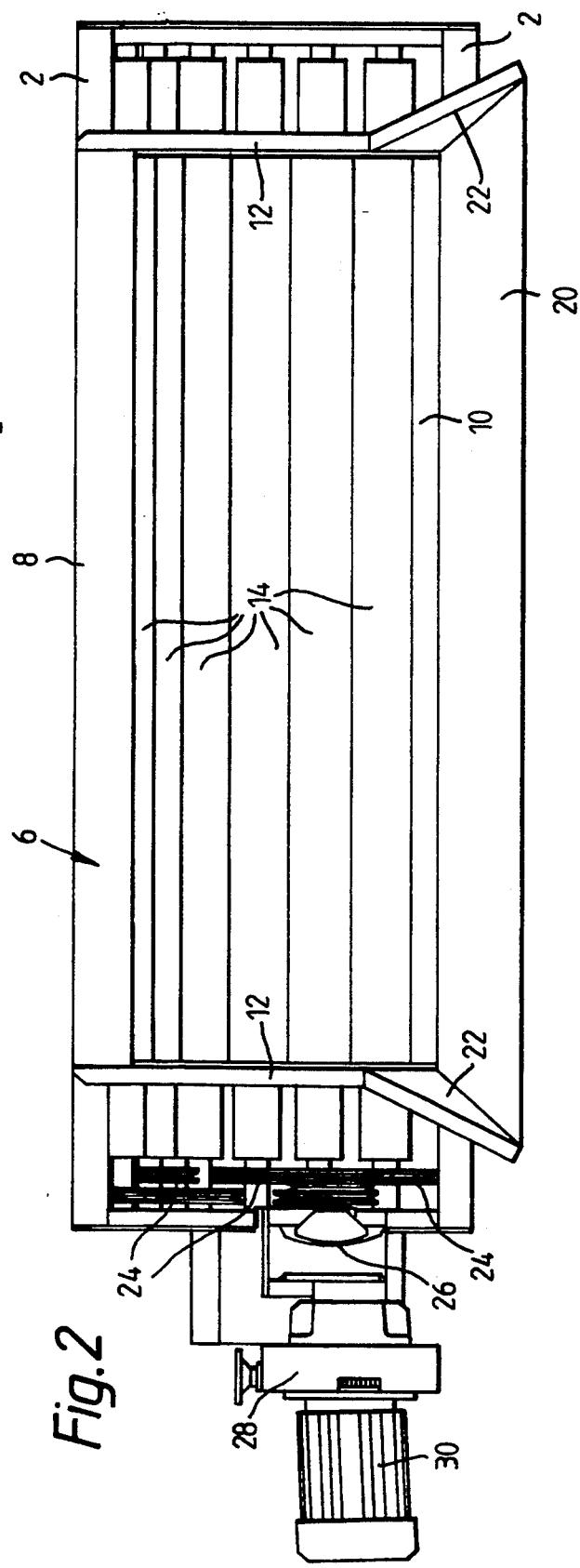

PEELING MACHINE FOR VEGETABLE PRODUCTS

BACKGROUND OF THE INVENTION

The present invention relates to a peeling machine for vegetable products and the like.

Peeling machines for peeling vegetable products and the like are adapted either for batchwise peeling of the vegetable products or for peeling the vegetable products while these are fed through a chamber in the peeling machine from a charging end to a discharging end of the peeling machine. The peeling machine according to the present invention is intended for batchwise peeling of vegetable products. A previously known peeling machine for batchwise peeling of vegetable products comprises a container in which the vegetable products are placed. The container comprises a bottom and a side wall which in horizontal section is of substantially circular shape. In the container there are provided peeling means for removing the peel of the vegetable products while there are established a relative movement and an engagement between the vegetable products and the peeling means. In a previously known type of a peeling device for batchwise peeling the peeling means are constituted by a grinding and cutting coating on the inner surface of the side wall and the bottom of the container. The coating can for example consist of carborundum grits. The relative movement and the engagement between the vegetable products and the cutting coating is in a previously known type of peeling machine for batchwise peeling provided by the fact that the bottom of the container is constituted by a plate which is rotatable around a circular axis and when being rotated, by the influence of the centrifugal force, displaces the vegetable products towards the side wall and here displaces the vegetable products around the lower part of the periphery of the container in engagement with the cutting coating.

The peeling machine for batchwise peeling of the kind described above has a restricted capacity and has restrictions also in respect of the efficiency and uniformity of the peeling action.

The object of the invention is to provide an improved peeling machine for batchwise peeling of vegetable products.

SUMMARY OF THE INVENTION

In order to comply with this object the peeling machine for batchwise peeling of vegetable products is according to the invention characterized in that the bottom of the container for receiving the vegetable products is at least partially constituted by a number of rotatable peeling rollers which are positioned parallell to each other.

A peeling machine of this kind provides for a more efficient ant uniform peeling of the vegetable products than previously known peeling machines for batchwise peeling. In addition thereto it is possible in a simple way to change the capacity of the peeling machine by providing the peeling machine with two or more containers provided with peeling means and adapted to be used successively. Thereby, the first container can be adapted for coarse peeling while following container or containers is or are adapted for successively finer peeling of the vegetable products. The last container in the succession of containers can be adapted for fine peeling with water and/or knife peeling.

The transfer of the vegetable products between the successive containers can be provided in a simple way by the fact that the containers are designed so as to be emptied by means of tipping.

In a preferred embodiment of the peeling machine according to the invention at least a section of the part of the bottom of the container which is constituted by the peeling rollers forms a concavely curved surface, which is of for example elliptic shape. Thereby the peeling rollers can adjacent one side of the container be positioned in a horizontal plane taking a successively higher level in a concavely curved surface in the direction of the opposite side of the container. In the case that the curved surface is of elliptic shape the curved surface may constitute about a forth of an ellipse with the largest radius of curvature positioned at one side of the container with substantially horizontal orientation and the smallest radius of curvature positioned at the opposite side of the container with substantially vertical orientation.

It is preferred that the peeling rollers have at their surfaces cutting elements, for example consisting of cutting grits of carborundum provided as a coating on the rollers. Thereby the cutting elements on one or more of the rollers can be provided within surface portions which are separated from each other and between which there are provided smooth ant preferably glossy surface portions of the rollers. This provides for a substantially improved removal of peel remains from the rollers while the edges between the surface portion provided with cutting element and the glossy surface portions of the rollers can be used for providing the vegetable products with a pattern of motion promoting the peeling of the vegetable products.

BRIEF DESCRIPTION OF THE DRAWINGS

The invention shall be described in the following with reference to the accompanying drawings.

FIG. 1 is a side view of a peeling machine for batchwise peeling according to the invention.

FIG. 2 is a plan view of the peeling machine shown in FIG. 1.

FIG. 3 is a schematic section of the peeling machine according to

FIGS. 1 and 2 on line III—III of FIG. 1.

DESCRIPTION OF THE PREFERRED EMBODIMENT

Figure 3:
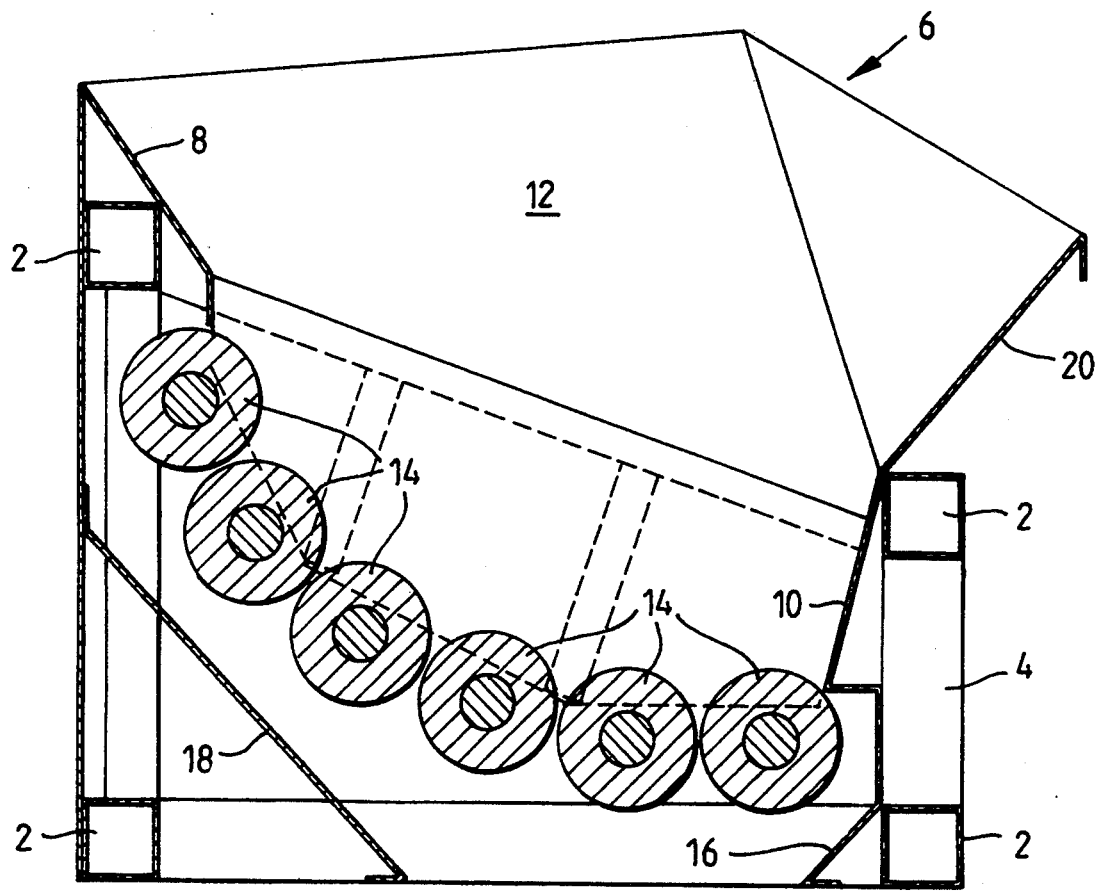

The peeling machine according to the invention is adapted for peeling vegetable products, preferably potatoes. The peeling machine is of the type for batchwise peeling, i.e. the peeling machine is supplied with a certain amount of unpeeled products, whereupon the peeling operation is conducted and the peeled product is removed from the peeling machine after which a new batch of unpeeled products is supplied to the peeling machine and so on.

The peeling machine is built on a frame consisting of longitudinal beams 2, posts 4, and conventional structural members. The frame supports a container 6 comprising a rear wall 8, a front wall 10 and side walls 12. The bottom of the container 6 is constituted by six parallell rollers 14 which at their end portions are rotatably journalled in the frame outside the side wall 12 of the container 6.

Below the rollers 14 the frame of the peeling machine supports a front collector plate 16 and a rear collector plate 18, the front collector plate 16 being connected with the front wall 10 and the rear collector plate 18 being connected with the rear wall 8. The collector plates 16 and 18 extend obliquely inwardly beneath the rollers. In the lateral direction the collector plates 16 and 18 extend somewhat outside the side walls 12. The collector plates 16 and 18 have the object of guiding waste material to a collector vessel or the like positioned below the peeling machine.

The front wall 10 of the container 6 has at its upper edge a portion 20 angled in forward direction and laterally projecting portions 22 in order to facilitate the supply of potatoes to the containers 6.

The rollers 14 are journalled in the frame of the peeling machine in such a way that the bottom of the container provided by the rollers will form a concavely curved surface having its lower edge at the front wall 10 of the container and its highest edge at the rear wall 8 thereof. Preferably the two rollers 14 being positioned adjacent the front wall 10 are journalled on the same height while the successive rollers are journalled with an increasing height difference in relation to the previous roller so that the radius of curvature of the bottom of the containers will decrease from the front wall 10 towards the rear wall 8. At the rear wall 8 the bottom surface formed by the rollers is of substantially vertical orientation. In a suitable embodiment of the invention the concavely curved surface of the bottom corresponds to the shape of a forth of an ellipse but it is of course possible to adapt the curvature in a desired way with regard to the product to be peeled and so on.

At one end the rollers 14 are provided with pulleys 24 which through V-belts, a split coupling 26 and a variator 28 are driven by an electric motor 30.

The rollers are provided with a coating consisting of cutting carborundum grits. These carborundum grits constitute the peeling means of the peeling machine and cut or grind away the peel of the potatoes when the rollers are rotated. During the peeling the rotational direction of all rollers 14 is such that the surfaces of the rollers, which form the bottom of the container 6 move away from the front wall 10 towards the rear wall 8. When the potatoes shall be peeled a suitable amount of the potatoes is charged in the container 6, the charging taking place while the peeling rollers 14 are stationary or rotate slowly in the peeling direction. If the peeling machine is dimensioned so that the peeling rollers 14 have a length of about 2.5 meters and a diameter of 105 mm a suitable charge weight for potatoes is 80–100 kg. When the potatoes have been charged in the container 6 the rotational speed of the peeling rollers 14 is increased by means of the variator 28 to a suitable value, the potatoes being thereby subjected to the influence of the carborundum grits of the peeling rollers 14 which provides that the peel of the potatoes are cut or ground away at the same time as the potatoes circulate from the front wall 10 of the container up to the highest roller at the rear wall 8 from which the potatoes are thrown back to the front wall 10 of the container.

The peel remainders fall down to the bottom of the peeling machine below the rollers 14 and are directed to some kind of suitable collecting vessel or other collecting place by means of the collector plates 16 and 18.

After the peeling has been completed the peeled potatoes are discharged from the container 6. This can be provided by tipping the container 6 which can be provided in respect of an axis, not shown, extending parallel to the rollers 14 in the vicinity of the upper edge of the rear wall 8. As an alternative the discharging can be accomplished by providing the front wall 10 of the container with an openable door (not shown). After the door has been opened the container can be emptied by rotating the rollers 14 in the opposite direction of rotation in relation to the direction of rotation used for the peeling.

Figure 4A:
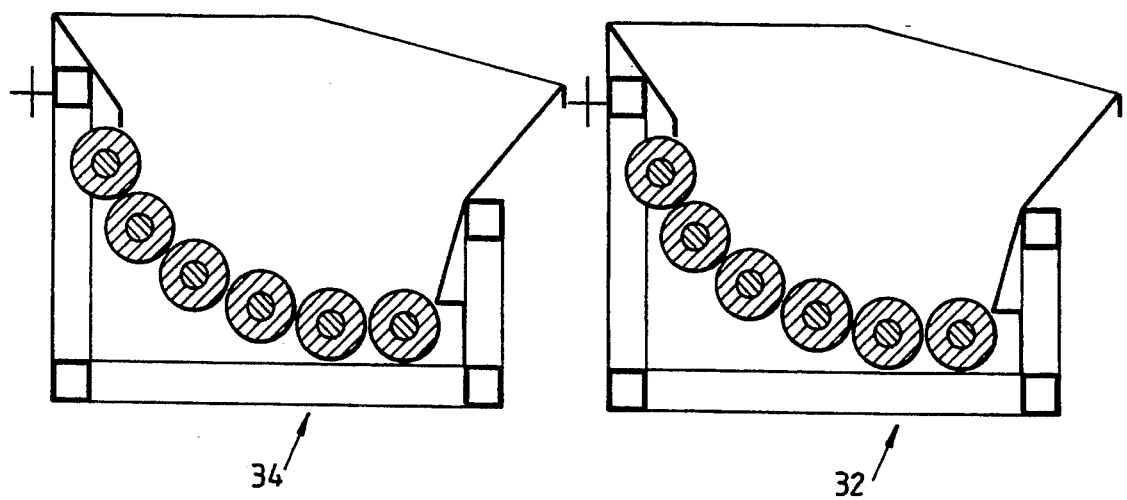
FIGS. 4a and 4b are schematic sections of a peeling machine consisting of two peeling units of the kind shown in FIGS. 1-3 in operative position and discharging position, respectively.
Figure 4B:
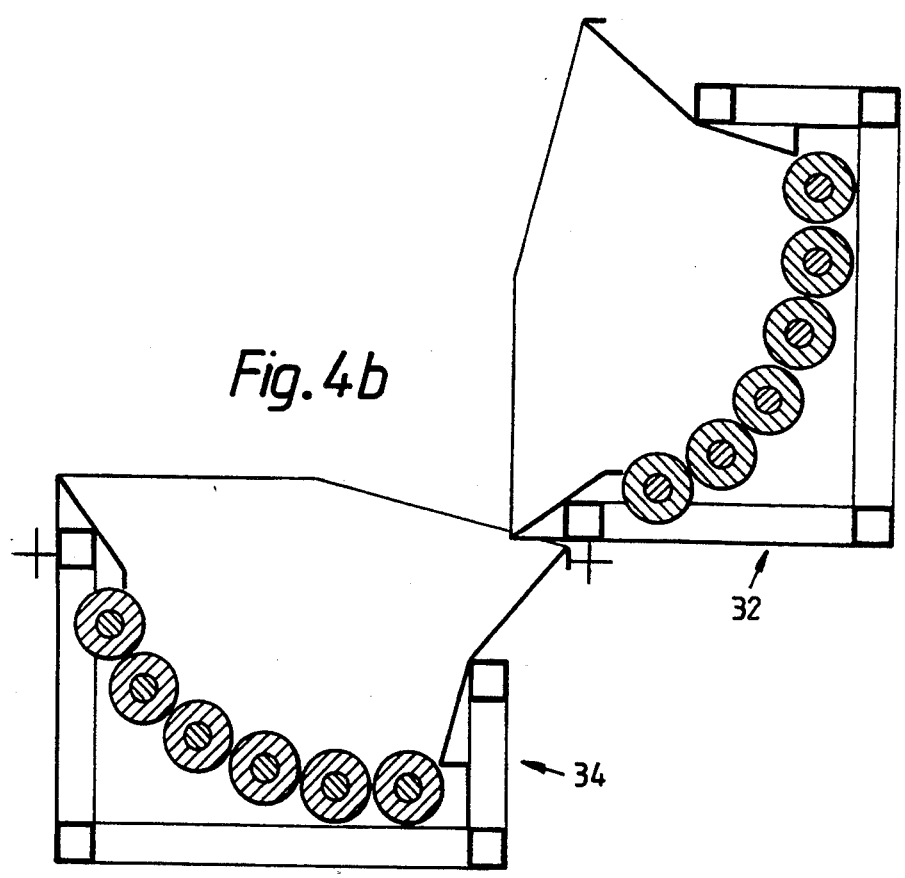

The capacity of a machine for batchwise peeling according to the invention can be increased by providing the peeling machine with two or more units of the kind shown in FIGS. 1–3. As schematically shown in FIGS. 4a and 4b the peeling machine can consist of two units 32 and 34, each unit being constructed in the same way as the peeling machine according to FIGS. 1–3. The peeling operation is hereby divided into two phases, in which the first phase which can consist of a coarse peeling without water is conducted in the unit 32. After the first phase has been completed the potatoes are tipped over to the unit 34 as shown in FIG. 4b, whereupon the final peeling which is constituted by a fine peeling and can be conducted with the addition of water is conducted in the unit 34. It is realized that the peeling device according to FIGS. 4a and 4b is operated so that the unit 34 is operating with fine peeling of a previous batch while the unit 32 is operating with coarse peeling of a new batch. The peeling machine can be constructed so as to include a desired number of units so that the peeling operation can be conducted in the most suitable way.

Figure 5:
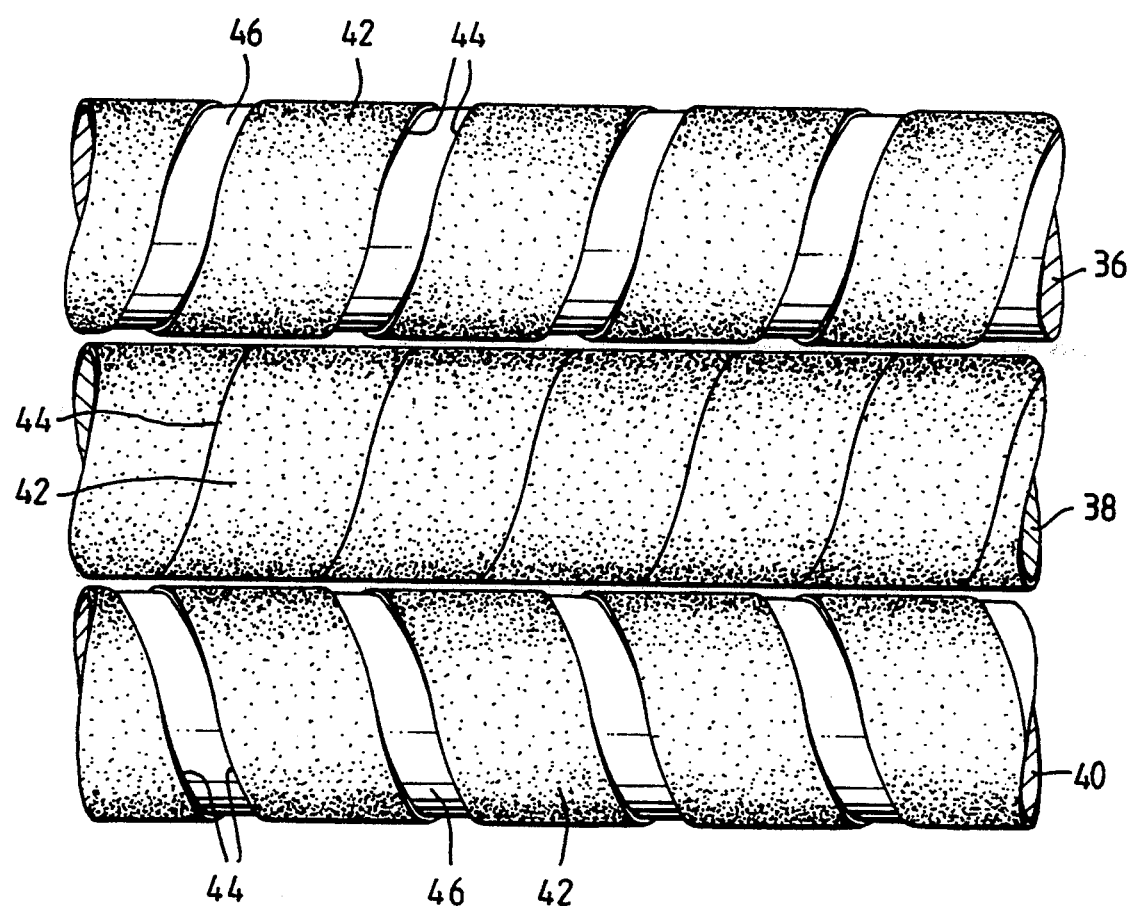
FIG. 5 is a plan view of three peeling rollers of a peeling machine according to the invention.

In FIG. 5 there is shown a plan view of three peeling rollers 36, 38 and 40 in a modified embodiment of a peeling device according to the invention. Conventional peeling rollers can be provided by helically winding the smooth cylinder surface of the rollers by means of a strip coated with carborundum, which is bound to the surface of the roller by means of a two component binding agent. According to the previously known technique the strip is wound with the edges close to each other so that the roller obtains the appearance of the roller 38 in FIG. 5. Here the carborundum strip is designated with reference numeral 42 while the edges of the strip engaging each other are designated with reference numeral 44.

In a modified embodiment of the peeling machine according to the invention the carborundum coating of the peeling rollers are positioned within surface portions separated from each other and between which smooth and preferably glossy surface portions of the rollers are provided. According to FIG. 5 this has been accomplished by winding the carborundum strip 42 onto the rollers 46 and 40 with a distance between the side edges 44 of the strip 42 so that surface portions 46 of the smooth surface of the roller are exposed between the side edges 44 of the carborundum strip 42. The carborundum strip 42 is wound in opposite directions on the rollers 36 and 40 so that the surface portions 46 will form on the rollers a right helix and a left helix, respectively.

The smooth surface portions 46 between the carborundum coating contribute to the action of subjecting the potatoes to movements during the peeling operation contributing to the efficiency and uniformity of the peeling. The smooth surface portions 46 also contribute to the efficient removal of the peel remainders from the rollers.

A peeling machine according to the invention can in a desired way be constructed of two or more units of the kind shown in FIGS. 1-3 and can be provided with different types of peeling rollers according to the principles shown in FIG. 5.

What is claimed is:

1. A peeling machine for batchwise peeling of vegetable products including peels comprising:

a container for receiving the vegetable products, said container including a bottom and first and second opposite sides;

peeling means, arranged in said container, for removing the peels of the vegetable products during relative movement and engagement between the vegetable products and said peeling means, wherein said peeling means comprises a plurality of rotatable peeling rollers, wherein each roller of said plurality of rotatable peeling rollers is positioned in parallel with all the other rollers of said plurality of rotatable peeling rollers;

wherein at least a part of said bottom of said container comprises said rotatable peeling rollers;

wherein at least a section of said at least a part of said bottom of said container forms a concavely curved surface; and wherein said peeling rollers adjacent said first side of said container are positioned in a horizontal plane, and wherein from said horizontal plane successive peeling rollers in the direction towards said second side of said container take a successively higher position in said concavely curved surface.

2. A peeling machine for batchwise peeling of vegetable products including peels comprising:

a container for receiving the vegetable products, said container including a bottom;

peeling means, arranged in said container, for removing the peels of the vegetable products during relative movement and engagement between the vegetable products and said peeling means, wherein said peeling means comprises a plurality of rotatable peeling rollers, wherein each roller of said plurality of rotatable peeling rollers is positioned in parallel with all the other rollers of said plurality of rotatable peeling rollers;

wherein at least a part of said bottom of said container comprises said rotatable peeling rollers;

wherein at least a section of said at least a part of said bottom of said container forms a concavely curved surface; and wherein said curved surface comprises an elliptic shape.

3. A peeling machine according to claim 2 wherein said container includes first and second opposite sides, wherein said curved surface comprises about a fourth of an ellipse, wherein said curved surface positioned adjacent said first side of said container comprises a substantially horizontal orientation and a first radius of curvature, wherein said curved surface positioned at said second side of said container comprises a substantially vertical orientation and a second radius of curvature, and wherein said first radius of curvature is larger than said second radius of curvature.

4. A peeling machine for batchwise peeling of vegetable products including peels comprising:

at least one container for receiving the vegetable products, said at least one container including a bottom;

peeling means, arranged in said at least one container, for removing the peels of the vegetable products during relative movement and engagement between the vegetable products and said peeling means, wherein said peeling means comprises a plurality of rotatable peeling rollers, wherein each roller of said plurality of rotatable peeling rollers is positioned in parallel with all the other rollers of said plurality of rotatable peeling rollers, wherein said peeling rollers each comprise a surface comprising cutting elements, said cutting elements comprising cutting grits of carborundum arranged as a coating on said peeling rollers;

wherein said cutting elements on at least one of said peeling rollers are arranged within first portions of said surface, said first surface portions separated by second portions of said surface, wherein said second surface portions comprise a smooth and glossy surface; and wherein at least a part of said bottom of said at least one container comprises said rotatable peeling rollers.

5. A peeling machine according to claim 1 wherein said at least one container comprises a plurality of containers, said plurality of containers intended for successive use.

6. A peeling machine for batchwise peeling of vegetable products including peels comprising:

a container for receiving the vegetable products, said container including a bottom;

peeling means, arranged in said container, for removing the peels of the vegetable products during relative movement and engagement between the vegetable products and said peeling means, wherein said peeling means comprises a plurality of rotatable peeling rollers, wherein each roller of said plurality of rotatable peeling rollers is positioned in parallel with all the other rollers of said plurality of rotatable peeling rollers, wherein said peeling rollers each comprise a surface comprising cutting elements, said cutting elements comprising cutting grits of carborundum arranged as a coating on said peeling rollers;

wherein said cutting elements on at least one of said peeling rollers are arranged within a first strip portion of said surface, said first strip portion comprising side edges, wherein said first strip portion extends helically around said at least one peeling roller with a space between facing side edges of successive passes of said first strip portion, wherein said space forms a helically extending, smooth and glossy second strip portion of said surface; and wherein at least a part of said bottom of said container comprises said rotatable peeling rollers.

7. A peeling machine for batchwise peeling of vegetable products including peels comprising:

a first container and at least one additional container for receiving the vegetable products, said first container and said at least one additional container each including a bottom;

peeling means, arranged in each of said first container and said at least one additional container, for removing the peels of the vegetable products during relative movement and engagement between the vegetable products and said peeling means, wherein each said peeling means comprises a plurality of rotatable peeling rollers, wherein each roller of said plurality of rotatable peeling rollers in said first container and said at least one additional container is positioned in parallel with all the other rollers of said plurality of rotatable peeling rollers in said first container and said at least one additional container respectively;

wherein at least a part of said bottom of each of said first container and said at least one additional container comprises said rotatable peeling rollers; and wherein said at least one additional container is intended for successive use with said first container.

8. A peeling machine according to claim 7 wherein said first container is adapted for coarse peeling, and wherein, said at least one additional container is intended for successively finer peeling of the vegetable products.

9. A peeling machine according to claim 7 wherein a last container of said at least one additional container in the succession from said first container is adapted for fine peeling with water peeling.

10. A peeling machine according to claim 7 wherein a last container of said at least one additional container in the succession from said first container is adapted for fine peeling with knife peeling.

11. A peeling machine according to claim 7 wherein a last container of said at least one additional container in the succession from said first container is adapted for fine peeling with water and knife peeling.

12. A peeling machine according to claim 7 wherein said first container and said at least one additional container are dischargeable by tipping.

13. A peeling machine for batchwise peeling of vegetable products including peels comprising:

a container for receiving the vegetable products, said container including a bottom and first and second opposite sides, said container further comprising a discharge door at said first side;

peeling means, arranged in said container, for removing the peels of the vegetable products during relative movement and engagement between the vegetable products and said peeling means, wherein said peeling means comprises a plurality of rotatable peeling rollers having peripheries, wherein each roller of said plurality of rotatable peeling rollers is positioned in parallel with all the other rollers of said plurality of rotatable peeling rollers;

wherein at least a part of said bottom of said container comprises said rotatable peeling rollers;

wherein said peeling rollers are adapted to rotate in a first common rotational direction during peeling operations, whereby said peripheries of said peeling rollers comprising at least a part of said bottom of said container move from said first side of said container towards said second side of said container; and wherein said peeling rollers are adapted to contribute to discharging the vegetable products within said container by rotating in a second common rotational direction opposite to said first common rotational direction.

14. A peeling machine for batchwise peeling of vegetable products including peels comprising:

a plurality of containers for receiving the vegetable products, each of said plurality of containers including a bottom;

peeling means, arranged in each of said plurality of containers, for removing the peels of the vegetable products during relative movement and engagement between the vegetable products and said peeling means, wherein said peeling means comprises a plurality of rotatable peeling rollers, wherein each roller of said plurality of rotatable peeling rollers is positioned in parallel with all the other rollers of said plurality of rotatable peeling rollers;

wherein at least a part of said bottom of each of said plurality of containers comprises said rotatable peeling rollers;

wherein at least a section of said at least a part of said bottom of each of said plurality of containers forms a concavely curved surface; and wherein said plurality of containers are intended for successive use.

15. A peeling machine for batchwise peeling of vegetable products including peels comprising:

a plurality of containers for receiving the vegetable products, each of said plurality of containers including a bottom;

peeling means, arranged in each of said plurality of containers, for removing the peels of the vegetable products during relative movement and engagement between the vegetable products and said peeling means, wherein said peeling means comprises a plurality of rotatable peeling rollers, wherein each roller of said plurality of rotatable peeling rollers is positioned in parallel with all the other rollers of said plurality of rotatable peeling rollers, wherein said peeling rollers each comprise a surface comprising cutting elements, said cutting elements comprising cutting grits of carborundum arranged as a coating on said peeling rollers;

wherein at least a part of said bottom of each of said plurality of containers comprises said rotatable peeling rollers; and wherein said plurality of containers are intended for successive use.

16. A peeling machine for batchwise peeling of vegetable products including peels comprising:

a container for receiving the vegetable products, said container including a bottom;

peeling means, arranged in said container, for removing the peels of the vegetable products during relative movement and engagement between the vegetable products and said peeling means, wherein said peeling means comprises a plurality of rotatable peeling rollers, wherein each roller of said plurality of rotatable peeling rollers is positioned in parallel with all the other rollers of said plurality of rotatable peeling rollers;

wherein at least a part of said bottom of said container comprises said rotatable peeling rollers;

wherein at least a section of said at least a part of said bottom of said container forms a concavely curved surface; and wherein said container is dischargeable by tipping.

* * * * *